(No Model.) 2 Sheets—Sheet 1.

F. H. KEUTHAN.
ANIMAL TRAP.

No. 470,577. Patented Mar. 8, 1892.

Witnesses
Edward W. Turrell
A. Bonville.

Inventor
Frederick H. Keuthan
by C. A. Moody
his atty (No Model.) 2 Sheets—Sheet 2.
F. H. KEUTHAN.
ANIMAL TRAP.

No. 470,577. Patented Mar. 8, 1892.

Witnesses:
A. Bonville
Edward W. Purrell

Inventor:
Frederick H. Keuthan
by C. D. Moody
his atty

UNITED STATES PATENT OFFICE.

FREDERICK H. KEUTHAN, OF ST. LOUIS, MISSOURI.

ANIMAL-TRAP.

SPECIFICATION forming part of Letters Patent No. 470,577, dated March 8, 1892.

Application filed November 6, 1891. Serial No. 411,073. (No model.)

*To all whom it may concern:*

Be it known that I, FREDERICK H. KEUTHAN, of St. Louis, Missouri, have made a new and useful Improvement in Traps, of which the following is a full, clear, and exact description.

The improvement relates to that class of traps having one stationary and one spring-actuated jaw and composed, mainly, of wire; and the improvement consists more especially in the special manner of forming that portion of the construction which constitutes the frame and the stationary jaw, substantially as is hereinafter described and claimed, aided by the annexed drawings, making part of this specification, in which—

Figure 1:
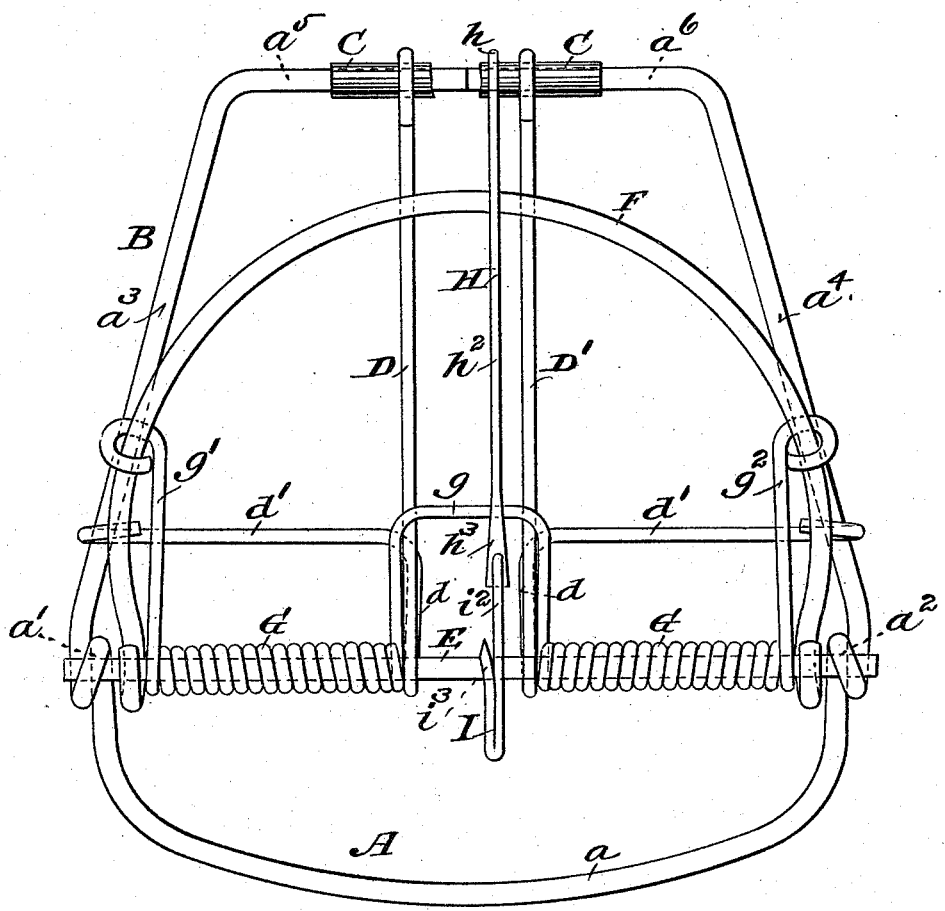
Figure 2:
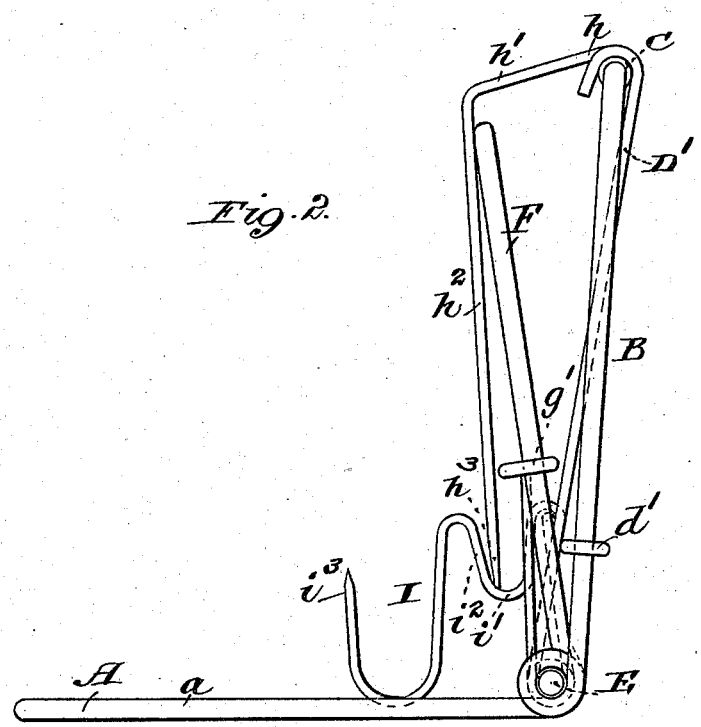

Figure 1 is a front elevation, looking downward, of the improved trap, the parts being arranged as when the trap is set; and Fig. 2 a side elevation of the same.

The same letters of reference denote the same parts.

The stationary jaw A is also the support of the trap. The wire of which it is composed is extended to also form the upright B, which may be considered the main member of the frame-work of the trap. To this end the wire $a$, after being shaped substantially as shown to form the jaw A, is formed into a coil $a'$ $a^2$ at each side of the trap for the purpose presently mentioned, and thence and at each side of the trap is extended upward at $a^3$ $a^4$ to the desired height, and thence from each side of the trap the wire is extended inward, as shown at $a^5$ $a^6$, to form the top bar of the upright; but to complete said top bar a sleeve C is employed to unite the parts $a^5$ $a^6$. In Fig. 1 the sleeve is shown broken away to exhibit the ends of the parts $a^5$ $a^6$. Thus a single wire suffices to form the stationary jaw and the principal portion of the frame of the trap.

Another feature of the upright is the wires D D', which extend from the top of the upright downward and around the rod E, thence upward at $d$ $d$, respectively, and thence laterally at $d'$ $d'$ to connect with the parts $a^3$ $a^4$, respectively, of the upright, substantially as shown. The movable jaw F is journaled upon the rod E, which in turn is held at its ends, respectively, in the coils $a'$ $a^2$. The movable jaw is actuated by the spring G, which is coiled around the rod E, with its middle portion or bight $g$ held upon the wires D D' and its ends $g'$ $g^2$ attached to the movable jaw substantially as shown and so that the spring tends to close the movable jaw when that part is released. The catch H and the bait-hook I serve to complete the construction. The catch in practice is a wire journaled at its upper end $h$ upon the sleeve C and extending thence forward at $h'$ and thence downward at $h^2$ and having a pointed end $h^3$. The bait-hook is journaled at its upper end $i$ upon the bight $g$ of the spring, and thence curving downward at $i'$, and thence upward at $i^2$, and thence downward and to form the hook-point $i^3$, substantially as shown. The trap is set by springing the movable jaw upward and passing the catch H over it and with the point of the catch held in the curve $i'$ of the bait-hook, substantially as shown. When the bait-hook is disturbed, the catch becomes dislodged from its connection with the bait-hook, and the movable jaw now being released is free to move and the spring operates to close it sharply against the stationary jaw.

I claim—

1. The combination of the base $a$, forming the jaw, the coils $a'$ $a^2$ at the ends of said jaw, and the upright B, all made of a single piece of wire, the sleeve uniting the inwardly-extending part of the upright, the rod E, held at its ends in the coils $a'$ $a^2$ aforesaid, the wires D D', extending from the top of the upright downward and around the rod E and thence upward and outward and about the upright, the spring G about the rod E and connected with the movable jaw F, and the catch H and bait-hook I, all operating as described.

2. In a trap having a stationary jaw and the upright made of a single piece of wire, combined with the rod E, the wires D D', coiled about it and at the other ends connected to the upright, the spring G about the rod, and the jaw F, movable on said rod E and operated by said spring, substantially as described.

Witness my hand this 4th day of October, 1891.

FREDERICK H. KEUTHAN.

Witnesses:
C. D. MOODY,
A. BONVILLE.